United States Patent [19]

Winkam et al.

[11] Patent Number: 5,735,176
[45] Date of Patent: Apr. 7, 1998

[54] MANUAL TRANSMISSION FOR A MOTOR VEHICLE

[75] Inventors: Gamjad Winkam, Zolling; Ewald Erbersdobler, Munich; Ernst Biskup, Eichenau, all of Germany

[73] Assignee: Bayerische Motoren Werke Aktiengesellschaft, Munich, Germany

[21] Appl. No.: 640,710

[22] Filed: May 1, 1996

[30] Foreign Application Priority Data

May 5, 1995 [DE] Germany ............ 195 16 651.5

[51] Int. Cl.⁶ .................. B60K 20/02; F16H 59/04
[52] U.S. Cl. ........................................... 74/337.5
[58] Field of Search ................................. 74/337.5

[56] References Cited

U.S. PATENT DOCUMENTS

| | | |
|---|---|---|
| 2,577,019 | 12/1951 | Kesterton . |
| 3,370,477 | 2/1968 | Lewis .................. 74/337.5 |
| 3,696,686 | 10/1972 | Steele ................. 74/337.5 |
| 5,136,780 | 8/1992 | Hishida . |
| 5,224,393 | 7/1993 | Ashikawa et al. ........ 74/337.5 |

FOREIGN PATENT DOCUMENTS

| | | |
|---|---|---|
| 0654624A1 | 5/1995 | European Pat. Off. . |
| 2500101 | 8/1982 | France . |
| 420431 | 10/1925 | Germany . |
| 650386 | 9/1937 | Germany . |
| 691346 | 5/1940 | Germany . |
| 708872 | 7/1941 | Germany . |
| 907139 | 8/1954 | Germany . |
| 943 742 | 6/1956 | Germany . |
| 1039865 | 4/1964 | Germany . |
| 2808894 | 9/1979 | Germany . |
| 3617011 | 11/1986 | Germany . |
| 3705454 | 8/1987 | Germany . |
| 4110555 | 10/1992 | Germany . |
| 9412122 | 11/1994 | Germany . |
| 2054773 | 2/1981 | United Kingdom . |

OTHER PUBLICATIONS

Patent Abstracts of Japan, JP60026858, JP830133527, Sep. 2, 1985, Takimoto Hideo, Manufacture of Change Drum.

*Primary Examiner*—Dirk Wright
*Attorney, Agent, or Firm*—Evenson McKeown Edwards & Lenahan, PLLC

[57] ABSTRACT

Manual transmission, particularly for a motor vehicle, in the case of which the individual shifting positions are sequentially engaged by a rotating of a shift roller. The shift forks of the manual transmission are guided directly on the shift roller and, as a result, the shift rod is eliminated. By uncoupling the shift forks from the forced control of the shift roller, the forced sequence can be eliminated when engaging the individual gears.

14 Claims, 6 Drawing Sheets

MANUAL TRANSMISSION FOR A MOTOR VEHICLE

BACKGROUND AND SUMMARY OF THE INVENTION

This invention relates to a manual transmission, particularly for a motor vehicle, having gear wheel pairings of fixed and loose wheels on at least two parallel shafts and one shifting device for the form-locking connection in the circumferential direction of one loose wheel respectively with a loose wheel shaft, the shifting device including connecting elements by means of which one loose wheel respectively can be fixed on the loose wheel shaft and these connecting elements are activated by way of shift forks guided on at least one shift rod by means of at least one shift roller.

It is known to carry out the shifting operation by way of shift rollers installed in manual transmissions. German Patent Document DE-OS 28 08 894 describes such a manual transmission, particularly for heavy motorcycles, in the case of which the shift forks are provided with one pin respectively which projects into a respective groove of a shift roller. According to the contour of the respective groove, the rotation of the shift roller causes the shifting operation by displacing a shift fork on the shift rod. The grooves on the shift roller are arranged such that their rotation causes a displacement of the shift forks in such a manner that all gears of the transmission are shifted through sequentially.

The described manual transmission has the disadvantage that, because of the space requirement of the shift roller, the transmission must have a larger size. In addition, the forced sequence of the shifting position of the transmission is unfavorable; the engagement of a gear cannot be skipped; and when the neutral position is engaged, the shifting operations which were carried out until then must be travelled through again.

It is an object of the invention to develop a manual transmission of the above-mentioned type operated by a shift roller in such a manner that it requires as little space as possible.

According to the invention, this object is achieved by providing an arrangement of the above noted type, wherein the shift forks are guided on the shift roller which simultaneously forms the shift rod.

According to the invention, no separate shift rod is necessary which is disposed in parallel to the shift roller in the transmission case. The functions of the shift rod are taken over by the shift roller on which therefore the shift forks are disposed in a displaceable manner. This has the advantage that the space for the shift roller can be saved in the transmission case. In addition, there is no shift rod component.

In an advantageous embodiment of the invention, each shift fork reaches around the shift roller on more than half of its circumference, in which case each shift fork is form-lockingly connected with the shift roller in the direction of the longitudinal axis of the shift roller by means of a projection projecting into a respective circumferential groove of the shift roller. A projection which is directed toward the inside in the shift fork hub has the advantage that, for guiding the shift fork on the shift roller for the form-locking connection, no additional space is needed inside the transmission case.

In a preferred embodiment of the invention, the projection is constructed as a sliding block and can be moved in an essentially radial direction with respect to the shift roller. This has the advantage that the sliding block can be lifted out of the circumferential groove of the shift roller and thus the forced control of the shift fork by means of the shift roller groove can be cancelled. If, in addition, the circumferential groove of the shift roller in the radial direction is constructed to be at least partially stepped, the sliding block can be lifted out onto the groove step which, in the case of a correspondingly designed groove, offers the possibility of constructing the form-locking guiding of the shift fork such that different movement sequences of the same shift fork are possible. Thus, it is possible, for example, to design the stepped grooves of the shift roller such that, by means of the lifting-out of the corresponding sliding block, the neutral position of the manual transmission is engaged immediately without previously having to pass through other shifting positions.

In the case of another preferred embodiment of the invention, by means of sliding blocks and circumferential grooves designed in a trapezoid shape in the radial direction—in which case the sliding block may also have a conical construction—, a centering of the form-locking connection is made possible during the moving-in of the sliding block. This has the advantage that the correct position of the shift fork is reached automatically even if the shift fork does not stand precisely above the circumferential groove. Thus, during the manufacturing of the transmission, larger tolerance dimensions between the components may be accepted. In this manner, the sliding block cannot easily jam.

In another preferred embodiment of the invention, the circumferential groove is constructed such that its slope changes essentially continuously viewed in the longitudinal direction of the shift roller. During a uniform rotation of the shift roller, the shift fork will therefore move non-uniformly. This non-uniform movement of the shift fork may advantageously be utilized for making the synchronizing operation during the fixing of a loose wheel take place more slowly than the displacement of the shift fork in the shift-through area. This, in turn, affects the durability of the components of the shifting device, such as synchronizing disks, etc.

In another preferred embodiment of the invention, the sliding blocks are fastened on the shift fork by means of an eccentric screw so that they can be adjusted in the longitudinal direction of the shift roller. As a result, advantageously, the shift forks in the transmission can be adjusted which also makes it possible that, during the manufacturing of the shifting device, the manufacturing tolerances may be increased.

If the shift roller is manufactured by means of sintering as a built-up shaft whose separating lines of the individual components are situated at least in each circumferential groove, it is achieved that the shift roller in its complicated shape can be manufactured at low cost.

Other objects, advantages and novel features of the present invention will become apparent from the following detailed description of the invention when considered in conjunction with the accompanying drawings.

DETAILED DESCRIPTION OF THE DRAWINGS

Figure 1:
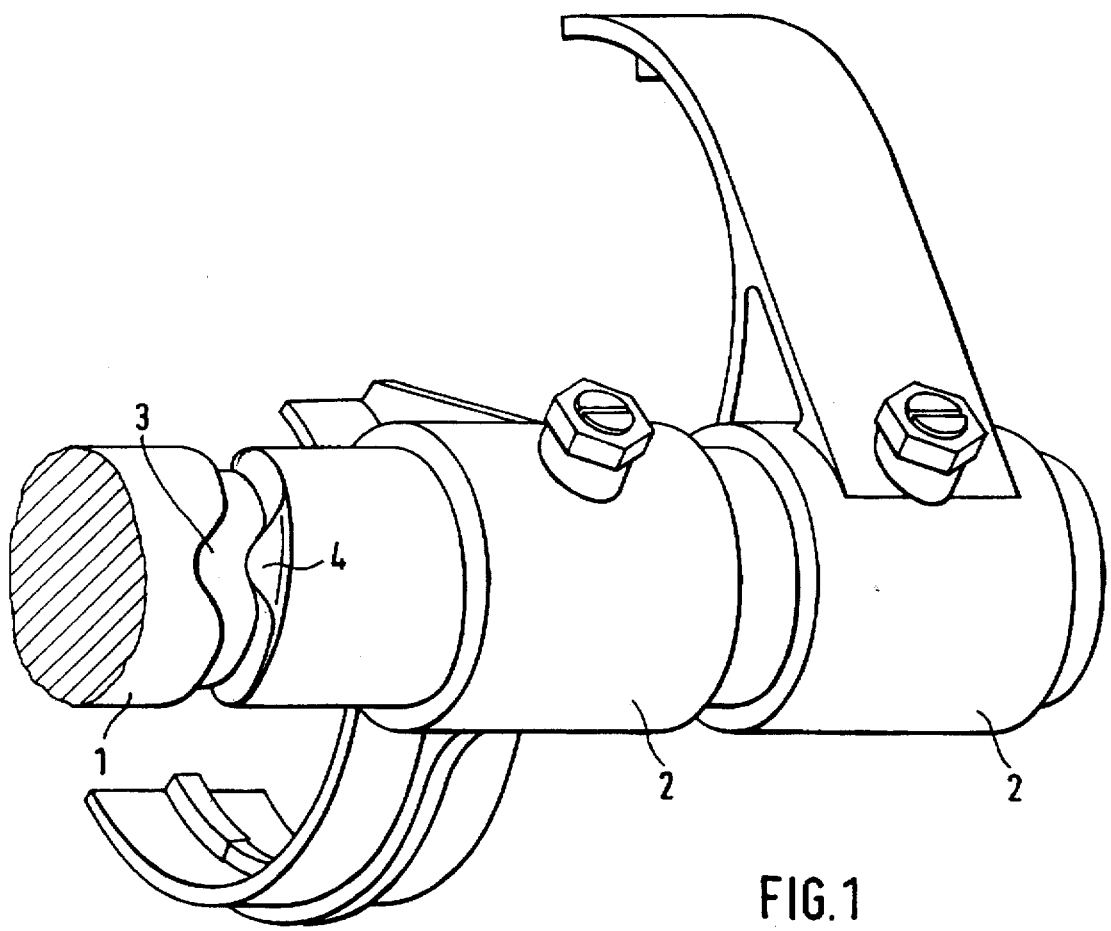
FIG. 1 is a schematic, part sectional perspective view of a shift roller with two shift forks, constructed according to a preferred embodiment of the present invention.

FIG. 1 illustrates a shift roller 1 with shift forks 2 guided on it. By the displacement on the shift roller 1 to the left or the right, each shift fork 2 can in each case, by way of a shifting device which is not shown, fix a loose wheel, which is not shown, on the loose wheel shaft, which is not shown. As a result, the respective desired gear position of the manual transmission is engaged. In the center position, each shift fork 2 is in its neutral position. When all shift forks 2 are in this neutral position, no loose wheel is fixed and therefore no gear position is engaged. The illustrated shift roller 1 for a motor vehicle transmission is provided for three shift forks 2, one of which is not shown, for the shifting of five forward and one reverse gear.

The displacement movement of the respective shift fork 2 for engaging the corresponding shift position is generated by a rotating movement of the shift roller 1 such that each shift fork 2 has a projection which is directed toward the shift roller 1 and which projects into a circumferential groove 3 of the shift roller 1. In the drawing, the circumferential groove 3 on the shift roller 1 is visible for a shift fork which is not shown. The two other circumferential grooves 3 for the illustrated shift forks 2 are not visible because, in this illustrated embodiment, the shift forks 2 reach completely around them. Like the visible circumferential groove 3, all circumferential grooves 3 have a certain contour in the longitudinal direction of the shift roller 1 and are contoured in the same manner in the radial direction. The contour of the circumferential groove 3 in the longitudinal direction controls the sequence of movements of the shift forks 2 such that the individual gears of the manual transmission can be engaged sequentially in a successive manner by means of the rotation of the shift roller 1. On the one hand, the contour in the circumferential groove 3 in the radial direction has a step 4 which is mounted at least on parts of the circumference of the circumferential groove 3. On the other hand, the circumferential groove 3 may have a trapezoid shape in the radial direction.

The step 4 inside the circumferential groove 3 is mounted such that a different sequence of movements of the shift forks 2 occurs when the projection of one or several shift forks 2 projecting into the circumferential groove 3 in the radial direction projects less than up to step 4 of the circumferential groove 3 into the latter. Thus, by changing the radial position of the projection of each shift fork 2, the sequence of its movement can be changed when the shift roller 1 is rotated. In this case, the projection of the shift fork 2 is constructed as a sliding block 5 (FIG. 3) which is mounted on the hub of the shift fork 2 so that it can be adjusted in the radial direction in such a manner that it projects into the circumferential groove 3. The adjusting of the sliding block 5 in the radial direction can take place, for example, mechanically, electrically or hydraulically.

Figure 2:
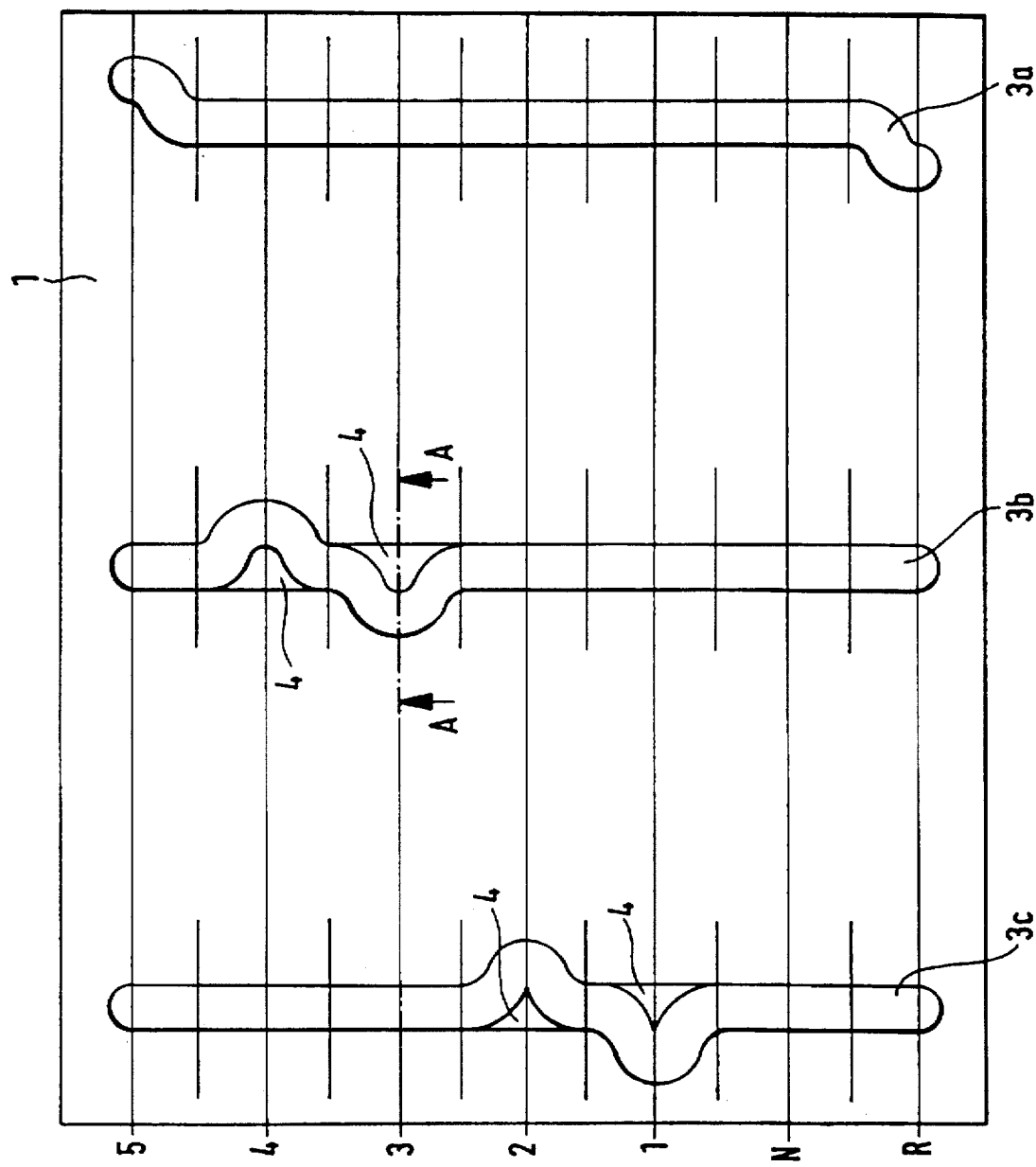
FIG. 2 a schematic view showing the shifting groove pattern of the shift roller of FIG. 1.

FIG. 2 illustrates the three circumferential grooves 3 for the shift forks from FIG. 1 in a development of a partial area of the shift roller 1. The circumferential groove 3a is used for controlling the movement of the shift fork 2 for engaging the fifth gear or the reverse gear. The circumferential groove 3b controls the shift fork 2 for engaging the third or the fourth gear while the circumferential groove 3c moves the shift fork for the first and the second gear. The left side of FIG. 2 shows the position of the shift roller 1 with respect to the position of the sliding blocks 5 in the respective gear. When a sliding block 5 is situated in a lateral bulge of a circumferential groove 3, the corresponding gear is engaged. By means of the rotation of the shift roller, which may take place mechanically, electrically or hydraulically, all transmission gears are sequentially engaged in a successive manner. The neutral position, in which no gear is engaged, is situated between the reverse gear and the first gear. Here, no circumferential groove 3a to 3c has a bulge. In order to be able to interrupt the sequential sequence of the shifting of the gears, the circumferential grooves 3b and 3c are constructed to be stepped in the radial direction. Along each bulge of the circumferential grooves 3b, and 3c, the step 4 is constructed in the respective circumferential groove in a plane situated radially farther on the outside with respect to the groove bottom. This step 4 makes it possible for a sliding block 5 (FIG. 3), which has also moved out radially to the outside partially from the circumferential groove 3b, 3c, to travel through a circumferential groove 3b, 3c without any displacement of the respective shift fork 2 on the shift roller 1. As a result, by the lifting-off of the respective sliding blocks 5 (FIG. 3), from any position of the shift roller 1, the neutral position of the shift roller 1 can be engaged without any sequentially following engagement of the gears disposed in-between. This permits a fast engaging of the neutral position without any wear of the not required shifting devices.

Figure 3:
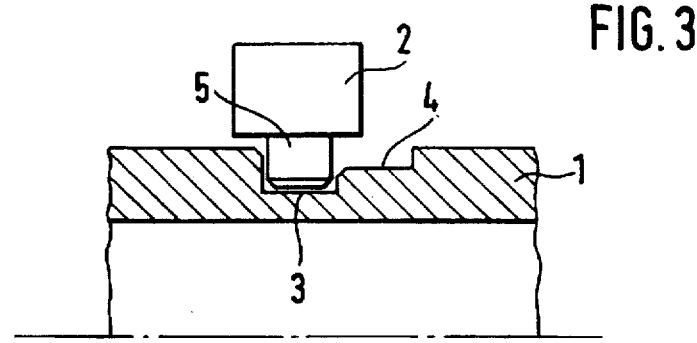
FIG. 3 is a sectional view of a sliding block in the circumferential groove of a shift roller, taken along plane A—A from FIG. 2.

FIG. 3 is a sectional view of the shift roller 1 in the area of a circumferential groove 3. The sliding block 5 is in the position in which a shift fork 2 on the shift roller 1 is moved to the left and the corresponding gear is engaged. The shift roller 1 was rotated, for example, with the lowered sliding block 5 which resulted in a sequential shifting sequence in the transmission. Had the shift roller 1 been rotated while the sliding block 5 is lifted off, the sliding block 5 would be situated on the step 4 and the shift fork 2 (FIG. 1) would not have been displaced to the left on the shift roller 1. Thus, by the lifting-off of the sliding block 5, the forced sequence of the sequential shifting is cancelled and the respective shift fork 2 remains in its center position when the shift roller 1 is rotated into the neutral position in which no gear is engaged.

In certain preferred embodiments trapezoid flanks are provided on the circumferential groove 3, which prevent a slight tilting of the sliding block 5 during the moving into the circumferential groove 3. For this purpose, the sliding block 5 also has a trapezoidal or conical shape.

Figure 4:
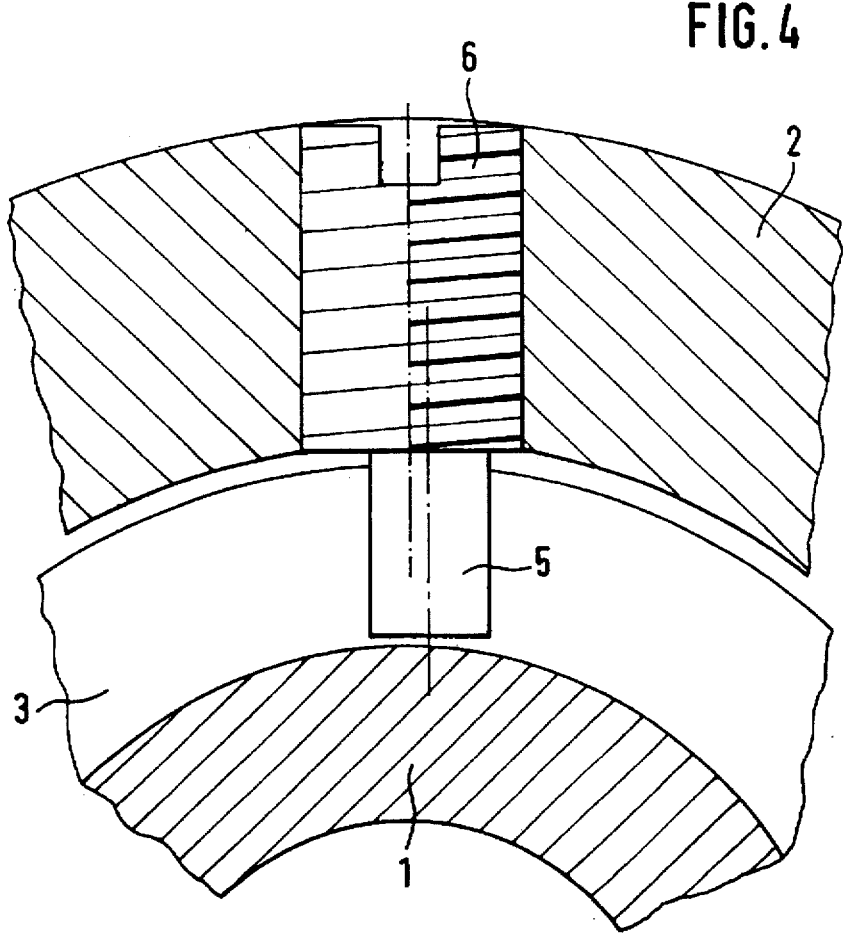
FIG. 4 is a view of an eccentric screw for use with the present invention.
Figure 3A:
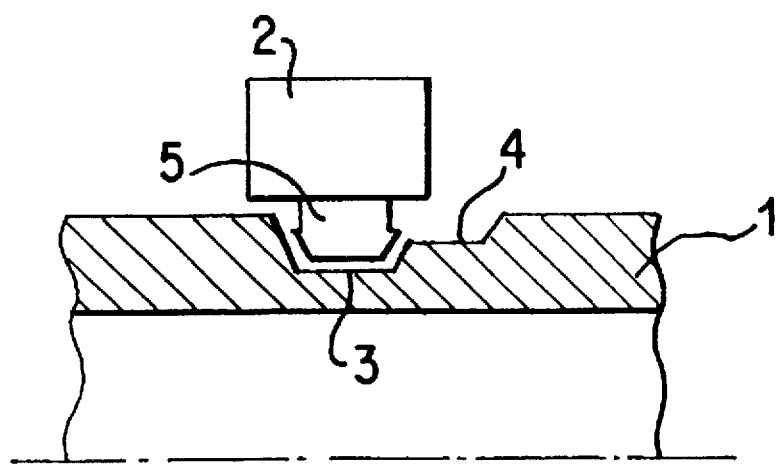
FIG. 3A is a sectional view similar to FIG. 3 and depicting an alternative embodiment with conical shaped groove and sliding block.
Figure 3B:
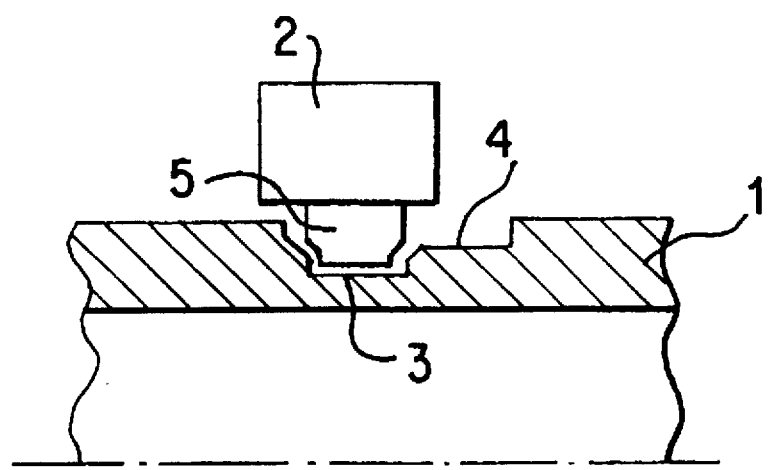
FIG. 3B is a sectional view similar to FIG. 3 and depicting an alternative embodiment with trapezoidal shaped groove and sliding block.

FIG. 4 illustrates an eccentric screw 6 by means of which the sliding block 5 is fastened in the shift fork 2. By means of rotating the eccentric screw 6, the sliding block 5 can be laterally adjusted in its position to the circumferential groove 3 for compensating manufacturing tolerances.

Figure 5:
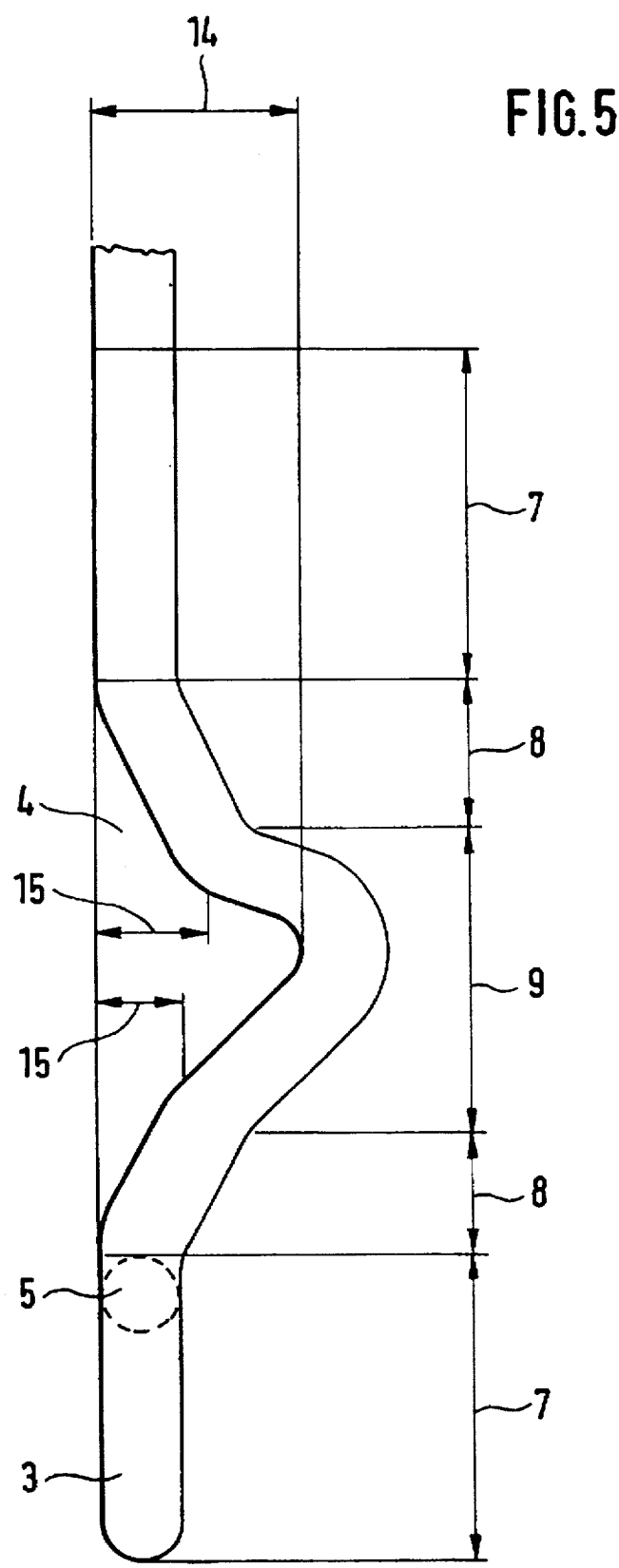
FIG. 5 is an enlarged illustration of a circumferential groove of the shift roller.

FIG. 5, in turn, shows a development of a circumferential groove 3 of the shift roller 1 in which a bulge of the circumferential groove 3 with its contour in the longitudinal direction of the shift roller 1 is illustrated in a detailed manner. Different sloping areas in the circumferential groove 3 can be recognized by means of which, when the shift roller 1 rotates in a uniform manner, different displacement speeds of the shift fork 2 can be reached on the shift roller 1. Reference number 7 marks the idle path phase in which the shift fork 2 is not moved. This is followed by the presynchronizing and main synchronizing phase 8 with a slow displacement speed of the shift fork 2 in order to render the synchronizing operation sufficiently slow which causes a long durability of the synchronizing arrangement. In the shift-through phase 9, each shift fork 2 can be moved more rapidly which shortens the shifting operation. Reference number 14 indicates the shifting path of the shift fork 2, and reference number 15 indicates the synchronizing paths of different lengths. The shorter of the synchronizing paths 15 is for the upshifting and the longer one is for the downshifting.

Figure 6:
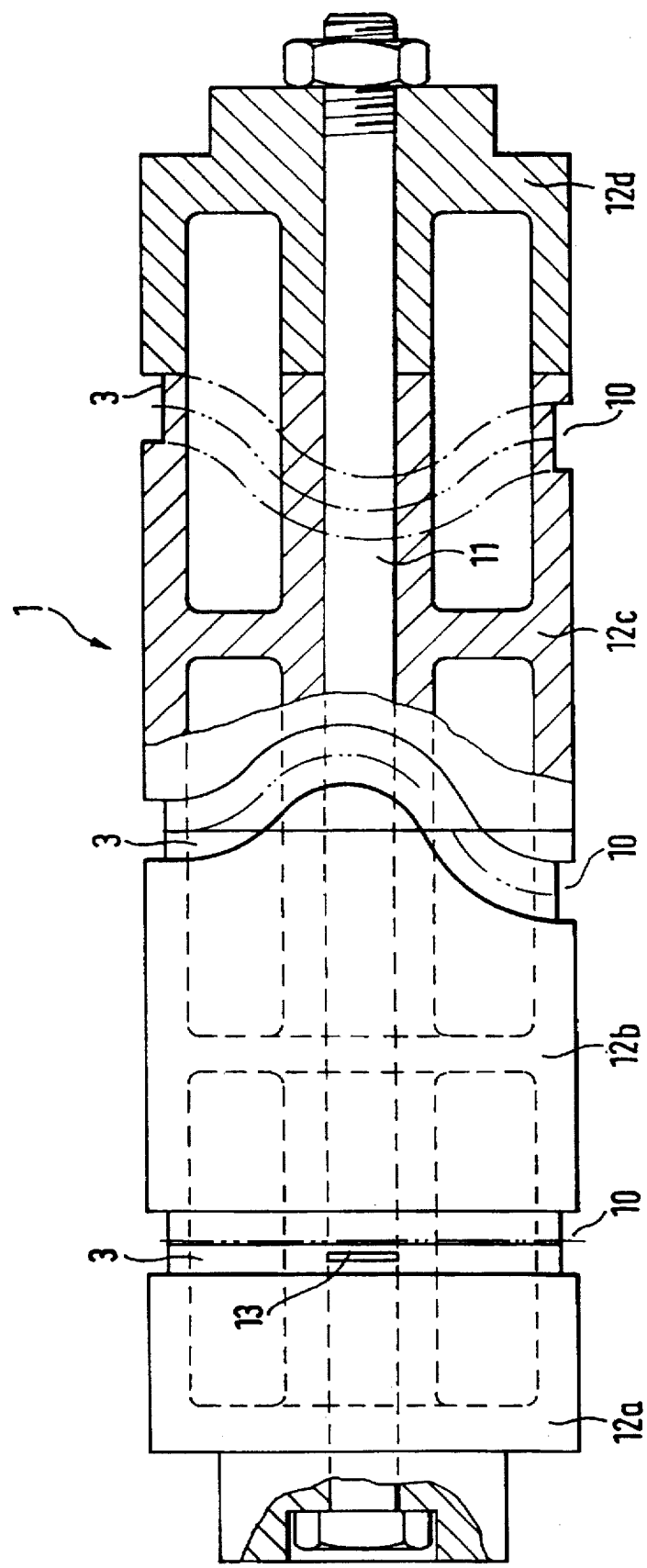
FIG. 6 is a side part sectional view of built-up shift roller with segments manufactured in the sintering process corresponding to the invention.

A built-up shift roller 1 is illustrated in FIG. 6. The individual parts of the shift roller 1 are produced by means of sintering; for this purpose, this shift roller 1 has separating lines 10 in each circumferential groove 3. A threaded pin 11 centers and braces the four segments 12a, 12b, 12c, 12d. A protection against torsion between the individual segments 12 is achieved by two opposed jaws 13 respectively.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A shifting assembly for a motor vehicle manual transmission of the type having gear wheel pairings of fixed and loose wheels on a plurality of parallel shafts, said shifting assembly comprising:
   a shift roller,
   a plurality of shift forks supported on the shift roller,
   a groove on one of the shift roller and shift fork for each shift fork, and
   a radial projection on the other one of the shift fork and shift roller projecting into a corresponding one of the grooves,
   said grooves being configured to effect axial movement of the associated shift fork, in response to rotational movement of the shift roller,
   wherein at least one of the circumferential grooves is constructed to be at least partially stepped in a radial direction to thereby define different shifting sequences at different step levels of the stepped groove portions.

2. A shifting assembly according to claim 1, wherein the grooves are circumferential grooves on the shift roller and the radial projections are on the shift forks.

3. A shifting assembly according to claim 2, wherein the shift forks are guided on the shift roller by reaching around the shift roller on more than half of its circumference, and wherein each shift fork has at least one projection which is directed toward the shift roller and projects into a circumferential groove of the shift roller.

4. A shifting assembly according to claim 3, wherein the projection of at least one shift fork is formed by a sliding block which can be selectively moved in an essentially radial direction with respect to the shift roller.

5. A shifting assembly according to claim 1, wherein the circumferential groove is designed such that, viewed in the longitudinal direction of the shift roller, its slope changes essentially continuously and/or that, in a shifting area in which the synchronizing operation takes place during the fixing of a loose wheel, the slope is smaller than in a shift-through area in which no synchronizing operation takes place.

6. A shifting assembly according to claim 3, wherein the sliding blocks are fastened on their respective shift fork by means of an eccentric screw so that they can be adjusted in the longitudinal direction of the shift roller.

7. A shifting assembly according to claim 1, wherein the shift roller is produced by means of a sintering process.

8. A shifting assembly according to claim 7, wherein the shift roller is produced as a built-up shaft which has separating lines of its individual segments at least in each circumferential groove.

9. A shifting assembly for a motor vehicle manual transmission of the type having gear wheel pairings of fixed and loose wheels on a plurality of parallel shafts, said shifting assembly comprising:
   a shift roller,
   a plurality of shift forks supported on the shift roller,
   a groove on one of the shift roller and shift fork for each shift fork, and
   a radial projection on the other one of the shift fork and shift roller projecting into a corresponding one of the grooves,
   said grooves being configured to effect axial movement of the associated shift fork, in response to rotational movement of the shift roller,
   wherein the grooves are circumferential grooves on the shift roller and the radial projections are on the shift forks,
   wherein the shift forks are guided on the shift roller by reaching around the shift roller on more than half of its circumference,
   wherein each shift fork has at least one projection which is directed toward the shift roller and projects into a circumferential groove of the shift roller,
   wherein the projection of at least one shift fork is formed by a sliding block which can be selectively moved in an essentially radial direction with respect to the shift roller, and
   wherein the circumferential groove is constructed to be trapezoidal in the radial direction and the sliding block is constructed to be correspondingly trapezoidal or conical.

10. A shifting assembly according to claim 9, wherein at least one of the circumferential grooves is constructed to be at least partially stepped in a radial direction to thereby define different shifting sequences at different step levels of the stepped groove portions.

11. A shifting assembly for a motor vehicle manual transmission of the type having gear wheel pairings of fixed and loose wheels on a plurality of parallel shafts, said shifting assembly comprising:
   a shift roller,
   a plurality of shift forks supported on the shift roller,
   a groove on one of the shift roller and shift fork for each shift fork, and
   a radial projection on the other one of the shift fork and shift roller projecting into a corresponding one of the grooves,
   said grooves being configured to effect axial movement of the associated shift fork, in response to rotational movement of the shift roller,
   wherein the grooves are circumferential grooves on the shift roller and the radial projections are on the shift forks,
   wherein the shift forks are guided on the shift roller by reaching around the shift roller on more than half of its circumference, wherein each shift fork has at least one projection which is directed toward the shift roller and projects into a circumferential groove of the shift roller wherein the projection of at least one shift fork is formed by a sliding block which can be selectively moved in an essentially radial direction with respect to the shift roller, and wherein at least one of the circumferential grooves is designed such that viewed in the longitudinal direction of the shift roller, its slope changes essentially continuously and/or that, in a shifting area in which the synchronizing operation takes place during the fixing of a loose wheel, the slope is smaller than in a shift-through area in which no synchronizing operation takes place.

12. A shifting assembly according to claim 11, wherein the sliding blocks are fastened on their respective shift fork by means of an eccentric screw so that they can be adjusted in the longitudinal direction of the shift roller.

13. A shifting assembly for a motor vehicle manual transmission of the type having gear wheel pairings of fixed and loose wheels on a plurality of parallel shafts, said shifting assembly comprising:

a shift roller, a plurality of shift forks supported on the shift roller, a groove on one of the shift roller and shift fork for each shift fork, and a radial projection on the other one of the shift fork and shift roller projecting into a corresponding one of the grooves, said grooves being configured to effect axial movement of the associated shift fork, in response to rotational movement of the shift roller, wherein the grooves are circumferential grooves on the shift roller and the radial projections are on the shift forks, wherein the shift forks are guided on the shift roller by reaching around the shift roller on more than half of its circumference, wherein each shift fork has at least one projection which is directed toward the shift roller and projects into a circumferential groove of the shift roller, wherein the projection of at least one shift fork is formed by a sliding block which can be selectively moved in an essentially radial direction with respect to the shift roller, and wherein the sliding blocks are fastened on their respective shift fork by means of an eccentric screw so that they can be adjusted in the longitudinal direction of the shift roller.

14. A shifting assembly for a motor vehicle manual transmission of the type having gear wheel pairings of fixed and loose wheels on a plurality of parallel shafts, said shifting assembly comprising:

a shift roller, a plurality of shift forks supported on the shift roller, a groove on one of the shift roller and shift fork for each shift fork, and a radial projection on the other one of the shift fork and shift roller projecting into a corresponding one of the grooves, said grooves being configured to effect axial movement of the associated shift fork, in response to rotational movement of the shift roller, wherein the grooves are circumferential grooves on the shift roller and the radial projections are on the shift forks, wherein the shift forks are guided on the shift roller by reaching around the shift roller on more than half of its circumference, and wherein each shift fork has at least one projection which is directed toward the shift roller and projects into a circumferential groove of the shift roller, wherein the projection of at least one shift fork is formed by a sliding block which can be selectively moved in an essentially radial direction with respect to the shift roller, wherein the shift roller is produced by means of a sintering process, and wherein the shift roller is produced as a built-up shaft which has separating lines of its individual segments at least in each circumferential groove.

* * * * *